(12) United States Patent
Saito (10) Patent No.: US 6,263,537 B1
(45) Date of Patent: Jul. 24, 2001

(54) DRIVE CONTROLLING APPARATUS FOR ROTARY WINDOW CLEANER

(75) Inventor: Shosaku Saito, Shizuoka (JP)

(73) Assignee: Saito Motors Co., Ltd., Shizouka-Ken (JP)

( * ) Notice: Subject to any disclaimer, the term of this patent is extended or adjusted under 35 U.S.C. 154(b) by 0 days.

(21) Appl. No.: 09/419,595

(22) Filed: Oct. 18, 1999

(51) Int. Cl.⁷ .................................................. B60S 1/44
(52) U.S. Cl. .................................. 15/250.22; 15/250.16; 15/250.17; 318/DIG. 2
(58) Field of Search ........................... 15/250.22, 250.12, 15/250.17, 250.16, 250.27; 318/DIG. 2, 443, 444, 484

(56) References Cited

U.S. PATENT DOCUMENTS

| | | | |
|---|---|---|---|
| 4,585,980 | * 4/1986 | Gille et al. | 318/DIG. 2 |
| 4,701,972 | 10/1987 | Saito . | |
| 4,773,117 | * 9/1988 | Saito | 15/250.22 |
| 5,210,900 | 5/1993 | Saito . | |

* cited by examiner

Primary Examiner—Gary K. Graham
(74) Attorney, Agent, or Firm—Rodman & Rodman (57) ABSTRACT

A drive controlling apparatus for a rotary window cleaner comprises an elevating motor for moving up and down two wipers, which are provided on a front window so as to be close to each other, to a storage position and a start position, a first motor for rotating the first wiper at the start position, a second motor for rotating the second motor at the start position in a direction opposed to that of the first wiper, and an electronic control circuit to which each brush board of the elevating motor, the first motor and the second motor is connected so as to perform the upward and downward movement, the intermittent operation, the medium-speed operation and the high-speed operation. The electronic control circuit is capable of controlling the two wipers so as to rotate one wiper after a predetermined time from one rotation of the other wiper and stop each wiper at the start position for a predetermined time every one rotation in the intermittent operation of the two wipers and so as to rotate the two wipers with a lag angle formed therebetween in the opposed directions so as not to interfere with each other in the medium-speed and high-speed operations.

6 Claims, 8 Drawing Sheets

on a front window so as to be close to each other, to a housing position and a start position, a drive motor for simultaneously rotating the two wipers in opposed directions at the start position, and a rotation delay setting member mounted to one junction shaft for transmitting rotation of the drive motor to the two wipers in order to prevent the two wipers from interfering with each other during rotation, thereby forming a lag angle between the two wipers to rotate them.

The drive controlling apparatus for the rotary window cleaner disclosed in the above-mentioned U.S. Patent just performs a low-speed operation and a high-speed operation but an intermittent operation can not be effected. Further, since the rotation delay setting member consists of a male member and a female member fitted to each other and a gap formed between the male member and the female member causes other wiper to be rotated late after one wiper is rotated, the operation is uncertain and an accurate lag angle cannot be formed between the two wipers, resulting in such a problem as that the two wipers interfere with each other in the high-speed rotation.

A drive controlling apparatus for a rotary window cleaner described in the U.S. Pat. No. 5,210,900 comprises an elevating motor for simultaneously moving up and down two wipers, which are provided on a front window so as to be close to each other, to a housing position and a start position, and respective drive motors for individually driving the two wipers, and a limit switch arranged for activating other drive motor after one drive motor is activated, whereby a lag angle is formed between the two wipers to rotate them in the opposed directions. However the lag angle between the two wipers is eliminated thereafter, when the two drive motors reach a certain rotational velocity. The drive controlling apparatus of this patent is adapted to connect rotating shafts of the two drive motors by a joint mechanism before the two drive motors reach the certain rotational velocity in order to prevent that the lag angle between the two wipers is eliminated and the two wipers are interfered with each other, and therefore, the two drive motors are driven by the same drive source, thereby rotating the two wipers whilst maintaining the lag angle.

The control apparatus for the rotary window cleaner disclosed in the above-mentioned U.S. Patent just performs the low-speed operation and the high-speed operation but it can not perform the intermittent drive. Further, since the joint mechanism is provided with the mechanical activating means to connect or disconnect the rotary shafts of the two drive motors with each other, the joint mechanism cannot accomplish the accurate and secure operation, and the mechanical activating means of the joint mechanism would be easily damaged owing to the shocks, because of the rotary shafts being connected with each other during rotation of the two drive motors, thus resulting in such a problem as that the two drive motors can not be accurately controlled.

SUMMARY OF THE INVENTION

An object of the present invention is to provide a drive controlling apparatus for a rotary window cleaner which can accurately and securely control an elevating motor for simultaneously moving up and down two wipers and two drive motors for individually driving the two wipers by an electronic control circuit and can perform the intermittent operation, the medium-speed operation and the high-speed operation with a lag angle maintained between the two wipers.

The controlling apparatus for the rotary window cleaner according to the present invention comprises an elevating motor for swiveling two motors, which are provided on a front window so as to be close to each other, to a housing position and a start position, a first motor for rotating a first wiper at the start position, and a second motor for rotating a second wiper at the start position in a direction opposed to the rotating direction of the first wiper. Respective brush boards for the elevating motor, the first motor and the second motor are connected to an electronic control circuit through an operation switch so as to enable the up-and-down movement, the intermittent operation, the medium-speed operation and the high-speed operation of the two wipers by the operation switch. The electronic control circuit is capable of controlling the two motors so as to enable rotation of the first wiper and the second wiper in the opposed directions with a lag angle formed therebetween to prevent the two wipers from interfering with each other in the intermittent operation, the medium-speed operation and the high-speed operation of the two wipers.

DETAILED DESCRIPTION OF THE PREFERRED EMBODIMENTS

Figure 1:
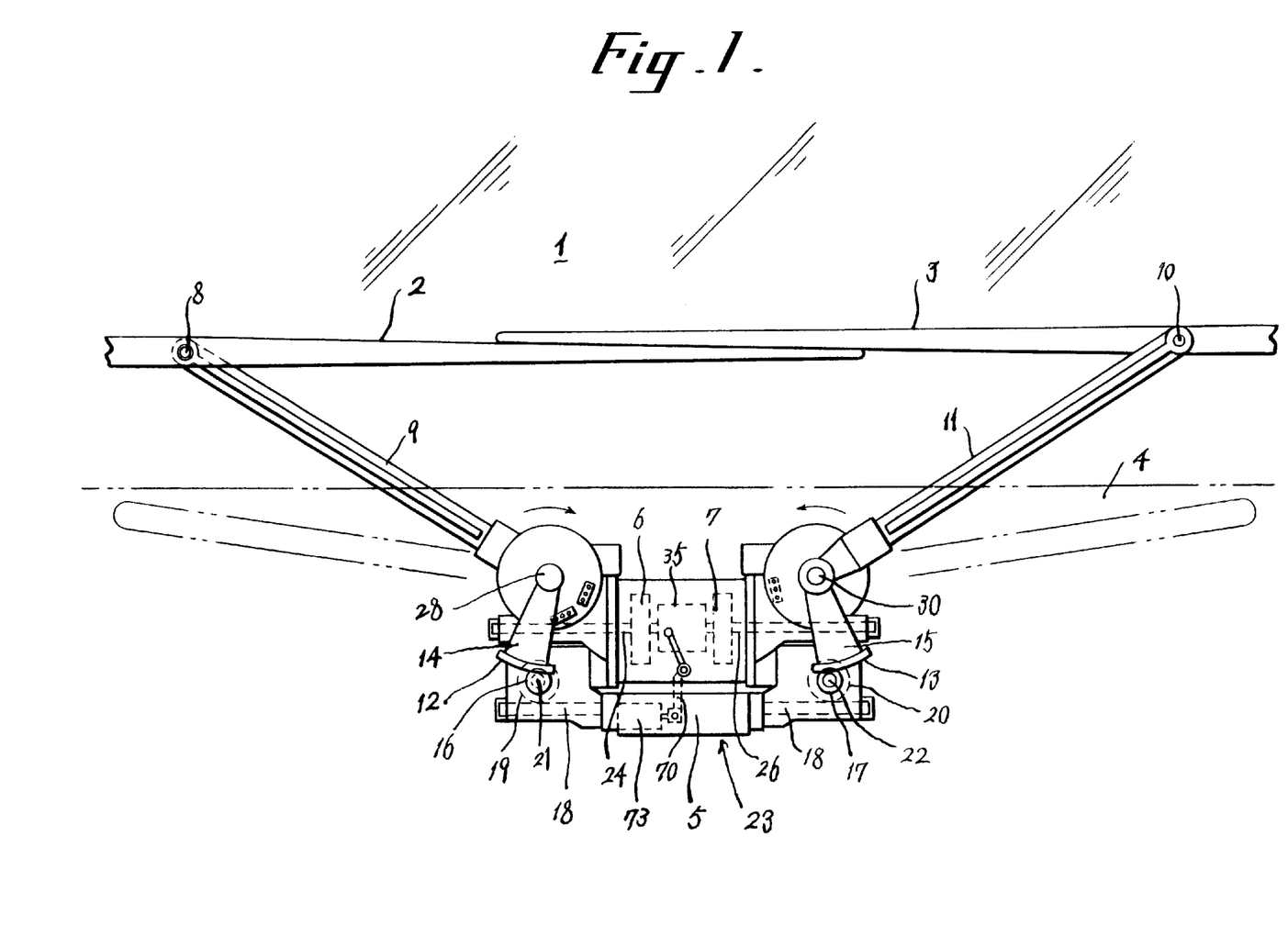
FIG. 1 is a front view of a rotary window cleaner having a drive controlling apparatus according to the present invention.
Figure 2:
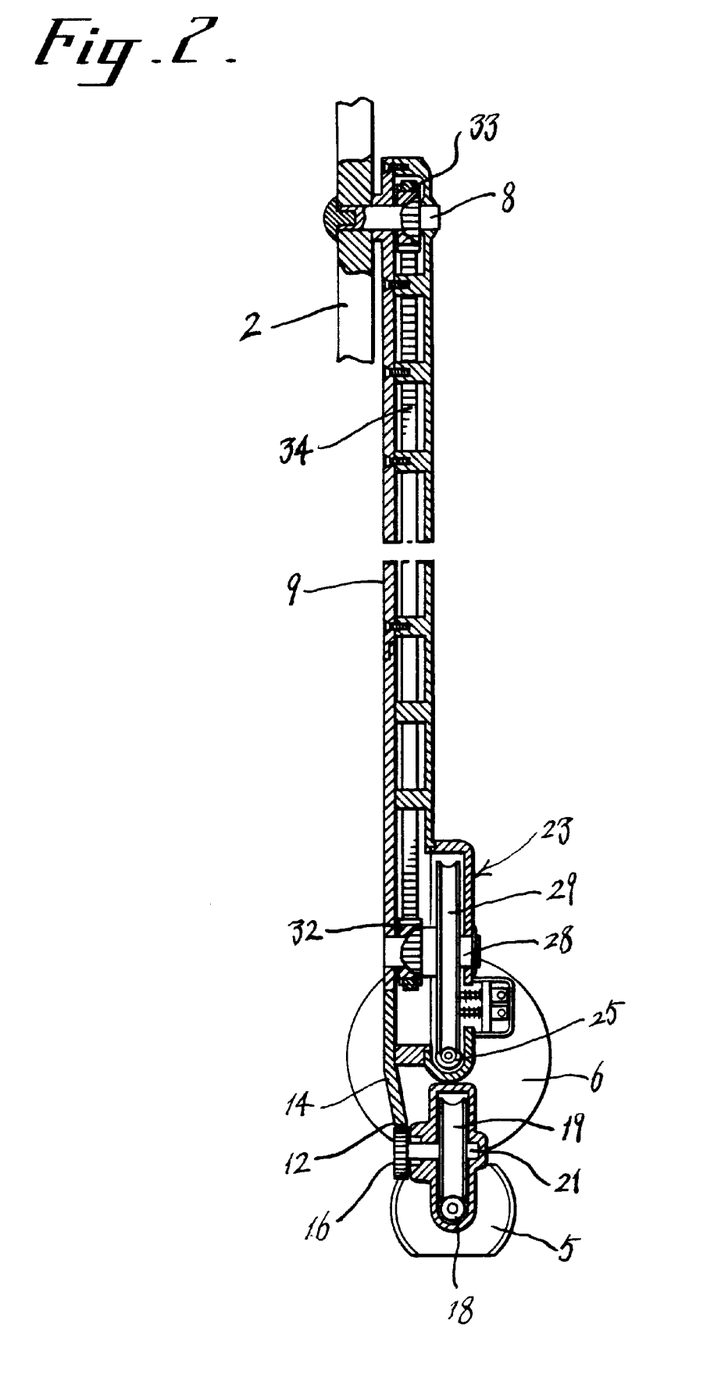
FIG. 2 is a longitudinal section view of a first wiper of the rotary window cleaner.

FIGS. 1 and 2 show a drive controlling apparatus for a rotary window cleaner according to the present invention. The drive controlling apparatus comprises an elevating motor 5 (see FIG. 2) for swiveling a first wiper 2 and a second wiper 3 disposed on a front window 1 of an automobile so as to be close to each other to a housing position within a bonnet 4 and a start position on the front window 1, a first motor 6 for rotating the first wiper 2 at the start position, and a second motor 7 for rotating the second wiper 3 at the start position in a direction opposed to the rotating direction of the first wiper 2.

The first wiper 2 is rotatably supported on a support cylinder 9 by a rotating shaft 8 and the second wiper 3 is rotatably supported on a support cylinder 11 by a rotating shaft 10 respectively. Each operating lever 14 and 15 is mounted to the support cylinder 9 and 11 respectively and is provided at the lower end with each gear 12 and 13, to which each pinion 16 and 17 is engaged respectively and is attached to each rotating shaft 21 and 22 of worm gears 19 and 20 engaging with a rotating shaft 18 of the elevating motor 5. Therefor each pinions 16 and 17 are rotated by driving the elevating motor 5 and moves each operating lever 14 and 15 by engaging with each gear 16 and 17 in order that the support cylinders 9 and 11 can move upwards and downwards to the start position on the front window 1 indicated by a solid line and the housing position within the bonnet 4 indicated by an alternate long and two short dashes line.

The support cylinders 9 and 11 are attached to a motor case 23 so as to be capable of swiveling. The first motor 6 for rotating the first wiper 2 and the second motor 7 for rotating the second wiper 3 are provided in the motor case 23, and the both motors 6 and 7 are adjacently arranged in parallel with each other. A screw portion 25 is formed on one end of a rotating shaft 24 of the first motor 6, and another screw portion 27 is similarly formed on one end of a rotating shaft 26 of the second motor 7. The screw portion 25 on the rotating shaft 24 of the first motor 6 is engaged with a motor gear 29 rotatably supported in the gear case by the support shaft 28 whilst the screw portion 27 on the rotating shaft 26 of the second motor 7 is engaged with the motor gear 31 rotatably supported in the gear case by the support shaft 30. A chain gear 32 is fixed to the support shafts 28 and 30 for the motor gears 29 and 31 and is provided in the support cylinders 9 and 11, and another chain gear 33 is fixed to the rotating shafts 8 and 10 for the first wiper 2 and the second wiper 3. A chain 34 is provided inside the support cylinders 9 and 10 and is stretched between the chain gear 32 and the chain gear 33. Each rotation of the first motor 6 and the second motor 7 is therefore transmitted to the motor gear 29 and 31 by means of the rotating shafts 24 and 26 and further to the first wiper 2 and the second wiper 3 through the chain 34, thereby rotating the wipers 2 and 3 in the opposed directions indicated by arrow heads. A joint mechanism 35 is provided between the other end of the rotating shaft 24 of the first motor 6 and the opposite other end of the rotating shaft 26 of the second motor 7, and hence the rotating shaft 24 of the first motor 6 can be connected or disconnected with the rotating shaft 26 of the second motor 7 by an activation lever 70 connected to the joint mechanism 35.

Figure 4:
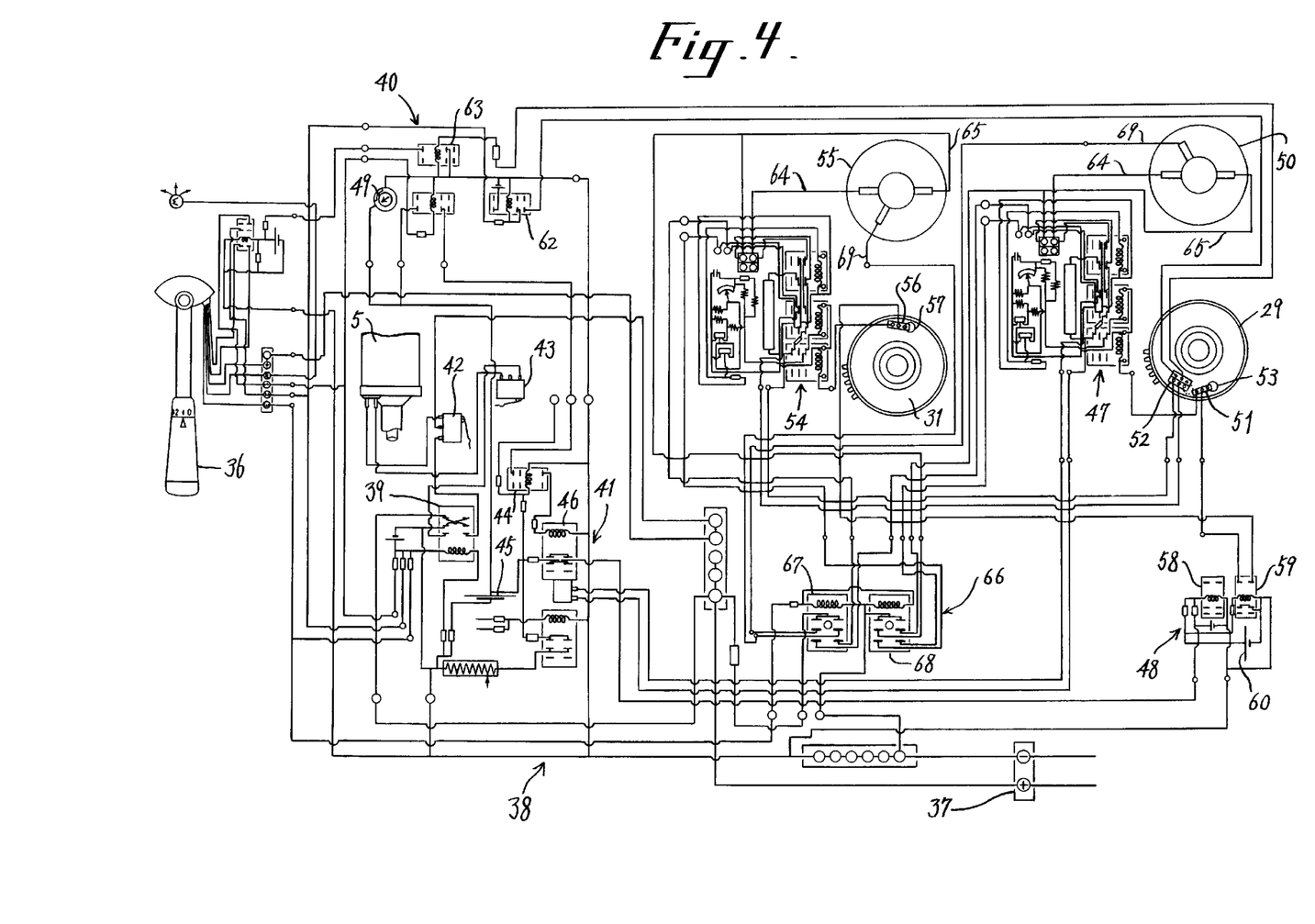
FIG. 4 is a diagram showing an electronic control circuit of the drive controlling apparatus according to the present invention.

The drive controlling apparatus according to the present invention includes an electronic control circuit 38 as shown in FIG. 4, which is connected with brush boards for the elevating motor 5, the first motor 6 and the second motor 7 and with a power supply 37 through an operation switch 36.

Figure 5:
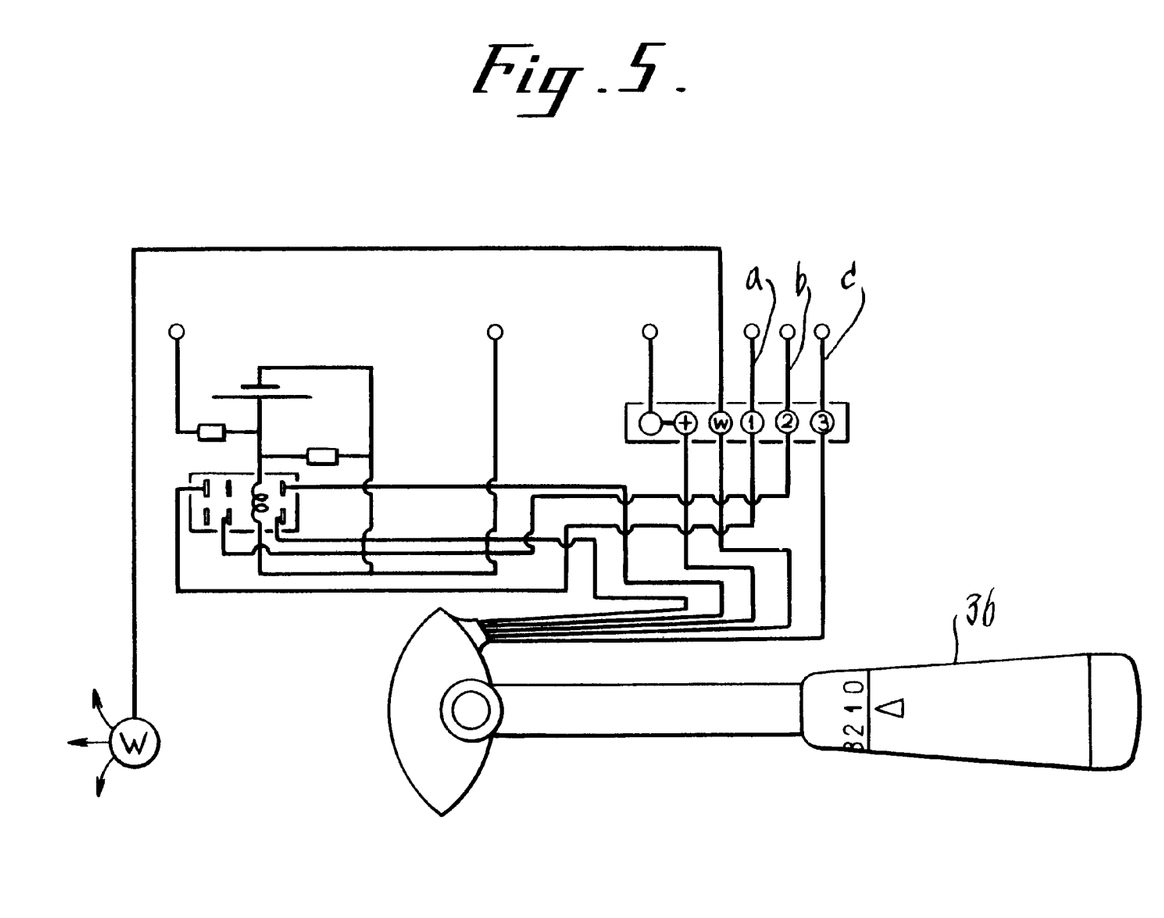
FIG. 5 is an explanatory view showing changeover positions of an operation switch of the electronic control circuit according to the present invention.

The operation switch 36 has a stop position (0) for stopping the wiper at the housing position, a changeover position (1) for moving up the wiper and performing the intermittent operation, another changeover position (2) for performing the medium-speed operation of the wiper, and a further changeover position (3) for performing the high-speed operation of the wiper. The electronic control circuit 38 can be connected with the changeover position (1), the changeover position (2) and the changeover position (3) of the operation switch 36 through conducting wires (a), (b) and (c), respectively.

Figure 6:
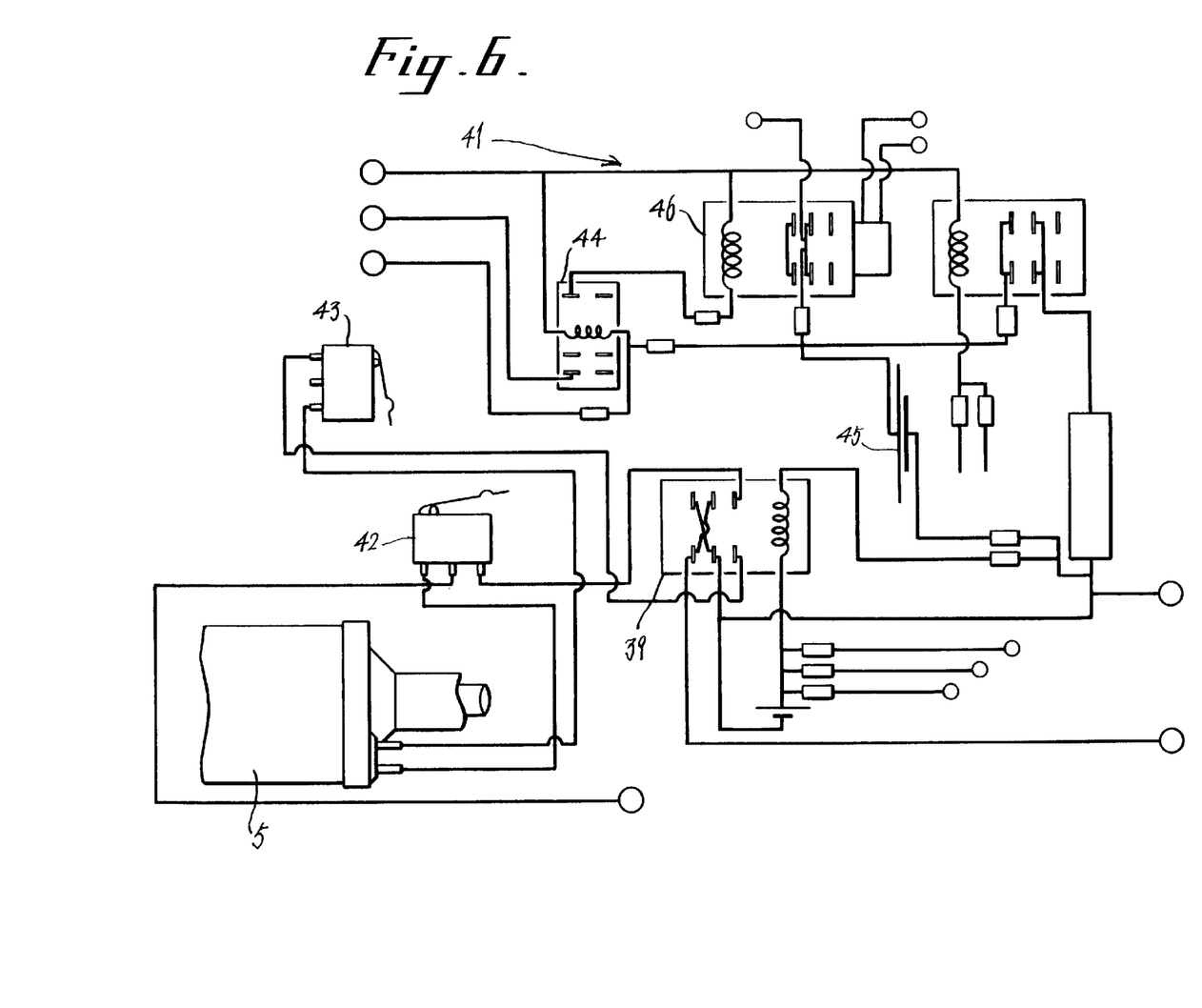
FIG. 6 is a circuit diagram showing an elevating relay of an elevating motor and an oscillation circuit in the electronic control circuit according to the present invention.

The changeover position (1) of the operation switch 36 for upwardly moving the wiper and performing the intermittent operation has its conducting wire (a) connected with an elevating relay 39 and an oscillation circuit 41 of the electronic control circuit 38. As shown in FIG. 6, the elevating relay 39 is connected with the brush board for the elevating motor 5 through an upper limit switch 42 which stops rotation of the elevating motor 5 at a position corresponding to the start position for the wipers 2 and 3 in order to stop the wipers 2 and 3 at the start position and through a lower limit switch 43 which stops rotation of the elevating motor 5 at a position corresponding to the housing position for the wipers 2 and 3. By turning on the elevating relay 39, the normal rotation of the elevating motor 5 is made to upwardly move the wipers 2 and 3 to the start position, while by turning off, the elevating relay 39 stops this upward movement. Further, in order to move the wipers downwards, the reverse rotation of the elevating motor 5 causes the wipers 2 and 3 to stop at the housing position.

The oscillation circuit 41 of the electronic control circuit 38 includes a first relay 44, a capacitor 45 and a second relay 46, which are connected with each other in parallel. The second relay 46 of the oscillation circuit 41 is connected with a first motor wiring board 47 and a brake setting circuit 48. The capacitor 45 is provided between the first relay 44 and the second relay 46. After the wipers 2 and 3 are moved upwards to the start position by switching the operation switch 36 to the changeover position (1), an oscillation signal for rotating the first motor 6 is transmitted. The first relay 44 of the oscillation circuit 41 is turned on, whereby the capacitor is charged. When the first relay 44 and the second relay 46 are simultaneously turned on, the capacitor 45 is turned on and hence the oscillation circuit 41 is also turned on. When the oscillation circuit 41 is turned on, the oscillation signal is transmitted to the first motor wiring board 47 and a brake signal is transmitted to the brake setting circuit 48. Since the electrical charge and discharge of the capacitor 45 of the oscillation circuit 41 are repeated at intervals of approximately five seconds, the oscillation circuit 41 transmits the oscillation signal and the brake signal at intervals of approximately five seconds to carry out the intermittent operation of the first motor 8. The interval of approximately five seconds for the capacitor 45 can be adjusted by using a volume 49 as shown in FIG. 4.

The first motor wiring board 47 is connected with a brush board 50 for the first motor 6 and with a brake sensor 51 provided in a gear box of the motor gear 29 for reducing the rotational velocity of the first motor 6, and it has a normal rotation relay, a reverse rotation relay and a time relay. An operation cam 53 attached to the motor gear 29 is adapted to engage with a brake sensor 51 and a second motor activation sensor 52, which are provided in the gear box of the motor gear 29, by rotation of the motor gear 29. The second motor activation sensor 52 is connected with a second motor wiring board 54, the second motor wiring board 54 is connected with both a brush board 55 for the second motor 7 and a brake sensor 56 provided in the gear box of the motor gear 31 for reducing the rotational speed of the second motor 7, and the second motor wiring board 54 has a normal rotation relay, a reverse rotation relay and a time relay. An operation cam 57 disposed to the motor gear 31 is adapted to engage with a brake sensor 56 by rotation of the motor gear 29. When the oscillation signal generated at intervals of approximately five seconds is transmitted to the first motor wiring board 47, the first motor wiring board 47 supplies the electric power to the brush board 50 via the normal rotation relay and rotates the first motor 6 together with the motor gear 29 in order to rotate the first wiper 2 at the start position. When rotation of the motor gear 29 causes the operation cam 53 to engage with the second motor activation sensor 52, a second motor activation signal is transmitted to the second motor wiring board 54, and the second motor wiring board 54 supplies the electric power to the brush board 55 via the normal rotation relay to rotate the second motor 7 as well as the motor gear 31. The second motor 7 for the second wiper (3), therefore, rotates in a direction opposed to the rotational direction of the first motor 6 for the first wiper 2 with a predetermined lag angle after activating the first motor 6 for the first wiper 2.

A brake setting circuit 48 includes a first relay 58 connected with the oscillation circuit 41, a second relay 59 connected with both the brake sensor 51 which is connected with the first motor wiring board 47 and the brake sensor 56 which is connected with the second motor wiring board 54 by means of two parallel points, and a capacitor 60 connected between the first relay 58 and the second relay 59 in parallel. The first relay 58 is turned on by transmitting a brake signal as well as the oscillation signal in order to electrically charge the capacitor 60, and the capacitor 60 is turned on when the first relay 58 and the second relay 59 are simultaneously turned on, thereby turning on a brake power supply. The turn-on of the second relay 59 causes the brake sensors 51 and 56 and the brake power supply to wait in the energized state. When the motor gear 29 makes one rotation, the operation cam 53 engages with the brake sensor 51. This engagement energizes the brake power supply and the time relay of the first motor wiring board 47, and turns off the normal rotation relay and turns on the reverse rotation relay of the first motor wiring board 47 to transmit the brake signal to the brush board 50 for the first motor 6, whereby the motor gear 29 is temporarily stopped together with the motor 6 to stop the wiper 2 at the start position. Thereafter, when the motor gear 31 makes one rotation, the operation cam 57 engages with the brake sensor 56. This engagement energizes the brake power supply and the time relay of the second motor wiring board 54, and turns off the normal rotation relay and turns on the reverse rotation relay of the second motor wiring board 47 to transmit the brake signal to the brush board 55 for the second motor 7, whereby the motor gear 31 is temporarily stopped together with the second motor 7 to stop the second wiper 3 at the start position. After a predetermined time, i.e., after approximately five seconds, the next oscillation signal is supplied and the intermittent operation is performed at intervals of about five seconds.

Figure 7:
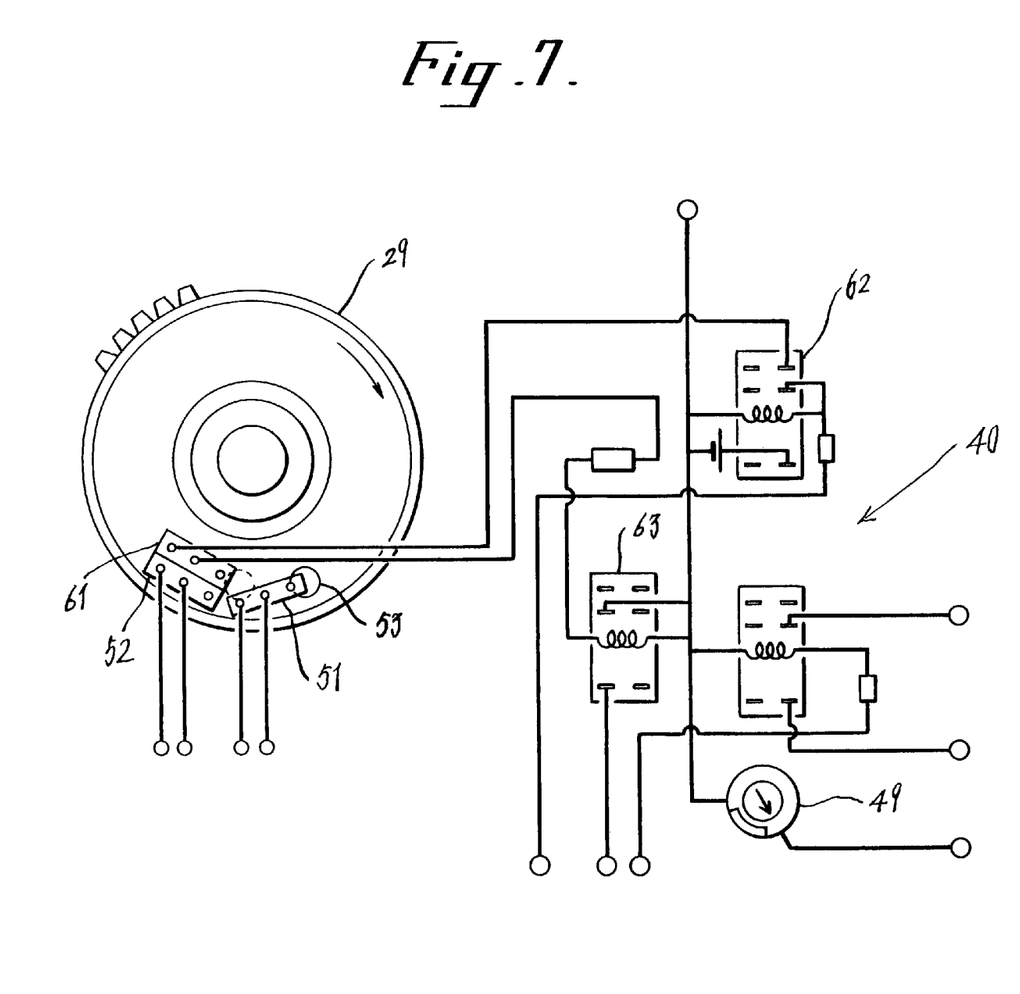
FIG. 7 is a circuit diagram showing a circuit switching between the intermittent operation and medium-speed operation.

The changeover position (2) of the operation switch 36 for performing the medium-speed operation of the wiper has its conducting wire (b) connected with an intermittent/medium-speed operation switching circuit 40 of the electric control circuit 38, and the intermittent/medium-speed operation switching circuit 40 consists of an oscillation circuit 41, a first relay 62 connected with a medium-speed operation wire coupler 61 that is connected with the second motor activation sensor 52, and a second relay 63 connected with the medium-speed operation wire coupler 61 that is connected with the first relay 62 and the second sensor 52, as shown in FIG. 7. In the changeover position (2), the intermittent/medium-speed operation switching circuit 40 is connected with the normal rotation relay of the first motor wiring board 47 connected with an intermittent/medium-operation wire 64 of the first motor brush board 50 through the oscillation circuit 41, and this circuit 40 is also connected with the normal rotation relay of the second motor wiring board 54 connected with the intermittent/medium-speed operation wire 64 of the second motor brush board 55 through the medium-speed operation wire coupler 61 that is connected with the second motor activation sensor 52 arranged in the gear box of the first motor gear 29. When the operation switch 36 is switched from the changeover position (1) to the changeover position (2), the medium-speed operation is effected instead of the intermittent operation, and the medium-speed operation signals are transmitted from the first motor wiring board 47 to the first motor brush board 50 and from the second motor wiring board 54 to the second motor brush board 55 at the same time. The first motor 6 and the first motor gear 29 as well as the second motor 7 and the second motor gear 31 continuously rotate at the medium-speed without making any stop, and the first wiper 2 and the second wiper 3 rotate in the directions opposed to each other to carry out the medium-speed operation of the wiper. The intermittent/medium-speed operation wire 64 is arranged on the brush boards 50 and 55 with an angle of 180 degrees formed between the intermittent/medium-speed operation wire 64 and a sending wire 65 in order to rotate the wipers at approximately 60 revolutions per second in the medium-speed operation.

Figure 8:
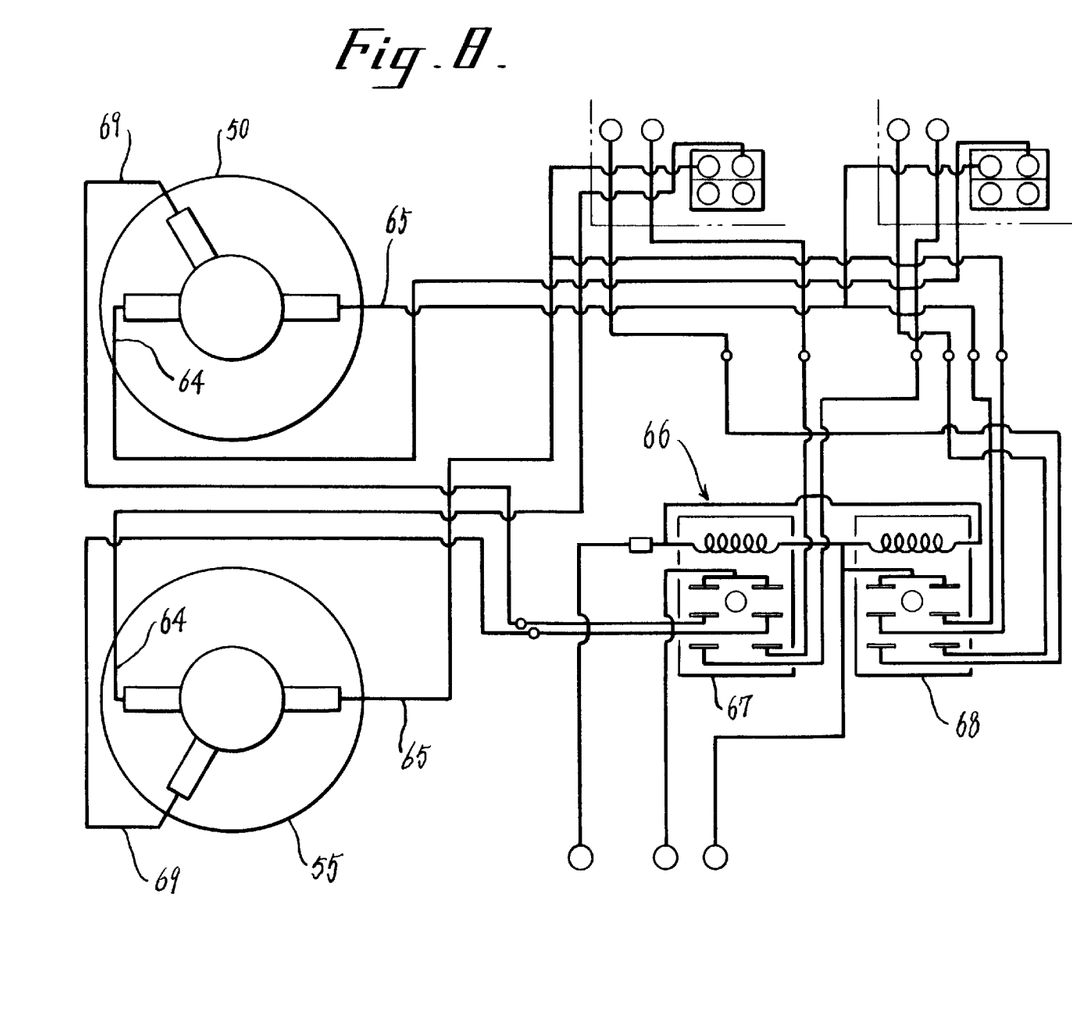
FIG. 8 is a circuit diagram showing a high-speed operation separation circuit according to the present invention.

The changeover position (3) of the operation switch 36 for carrying out the high-speed operation of the wiper is connected with a high-speed operation separation circuit 66 of the electronic control circuit 38 via the conducting wire (c) thereof, and the high-speed operation separation circuit 66 has a first relay 67 and a second relay 68 connected with each other in parallel, as shown in FIG. 8. The first relay 67 is connected with the power supply 37 and a high-speed operation wire 69 of and the first motor brush board 50 and the second motor brush board 55, and the second relay 68 is connected with the power supply 37 and the sending wire 65 of the first motor brush board 50 and the second motor brush board 55. By switching the operation switch 36 from the changeover position (2) to the changeover position (3), the operation is changed from the medium-speed operation to the high-speed operation, in which the first relay 67 and the second relay 68 are turned on, whereby the high-speed operation separation circuit 66 is turned on. Then, a high-speed operation signal is transmitted from the high-speed operation separation circuit 66 to the high-speed operation wire 69 of the first motor brush board 50 and the second motor brush board 55. Further, the first motor 6 and the first motor gear 29 together with the second motor 7 and the second motor gear 31 continuously rotate at high speed, and the first wiper 2 and the second wiper 3 rotate in the opposed directions to conduct the high-speed operation. The high-speed operation wire 69 is provided on the brush boards 50 and 55 with an angle of 230 degrees for high speed formed between the high-speed operation wire 69 and the sending wire 65 in order to rotate the wipers at approximately 120 revolutions per second in the high-speed operation.

Figure 3:
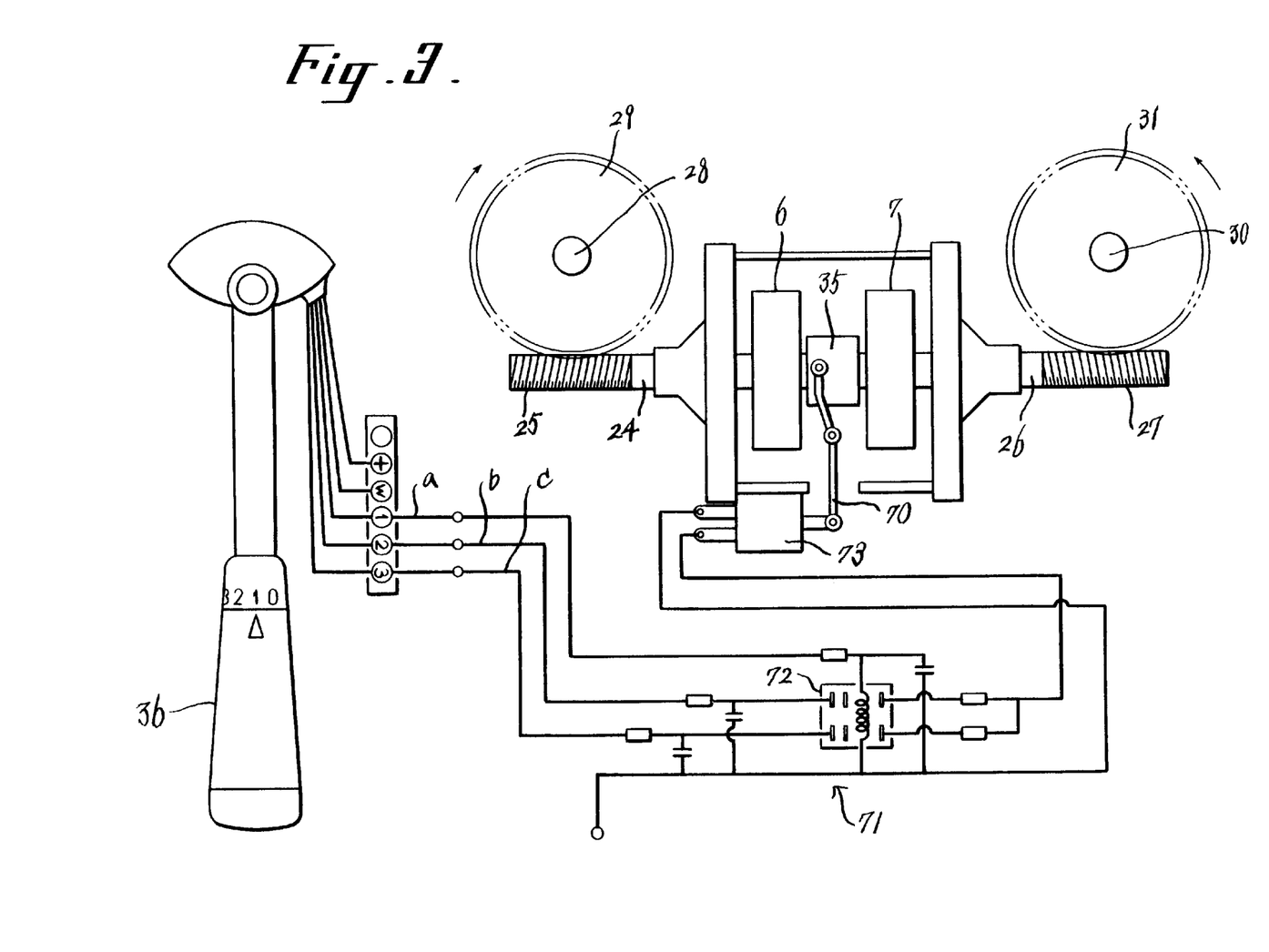
FIG. 3 is an explanatory view showing a docking circuit and joint mechanism of the drive controlling apparatus according to the present invention.

In addition, the electronic control circuit 38 is also provided with a docking circuit 71 that maintains the lag angle formed by activating the second wiper 3 after a predetermined time from activation of the first wiper 2 in the intermittent operation between the two wipers 2 and 3 even in the medium-speed operation and the high-speed operation in order to effect the medium-speed operation and the high-speed operation without interfering the two wipers with each other. The docking circuit 71 comprises a solenoid coil actuating relay 72 as shown in FIG. 3, and the relay 72 is connected with a solenoid coil 73 for activating an actuation lever 70 combined with the joint mechanism 35 and also connected with the changeover positions (1), (2) and (3) of the operation lever 36 through the conducting wires (a), (b) and (c) respectively. When the operation handle 36 is at the changeover position (1) for the intermittent-operation, the electric current is supplied through the conducting wire (a) to the docking circuit 71, and, therefore the solenoid coil actuating relay 72 has the turned off condition. As a result, the solenoid coil 73 is not energized, and the first and second wipers 2 and 3 can perform the intermittent operation by two driving sources of the first and second motors 6 and 7 with a lag angle.

When the operation handle 36 is switched from the changeover position (1) for the intermittent operation to the changeover position (2) for the medium-speed operation, the electric current flows through the conducting wire (b) to the docking circuit 71, and the solenoid coil actuating relay 72 is turned on to energize the solenoid coil 73. The solenoid coil 73 then pulls the actuation lever 70 to activate the joint mechanism 35, and the rotating shaft 24 of the first motor 6 is connected with the rotating shaft 26 of the second motor 7. The medium-speed operation can be, therefore, carried out with a lag angle formed between the first and second wipers 2 and 3 in the intermittent operation being maintained. Similarly, when switching to the high-speed operation, the electric current flows through the conducting wire (c) to the docking circuit 71, the solenoid coil actuating relay 72 remains turned on and the solenoid coil 73 is also energized. The joint mechanism 35 keeps connection made between the rotating shaft 24 of the first motor 6 and the rotating shaft 26 of the second motor 7, and the high-speed operation can be effected with a lag angle between the two wipers being maintained.

The following description will now be given as to the operation of the controlling apparatus for the rotary window cleaner according to the present invention.

When the operation handle 36 is switched from the stop position (0) to the changeover position (1), the elevating relay 39 is turned on through the conducting wire (a), and the elevating motor 5 is driven. When the two wipers 2 and 3 are moved up from the housing position to the start position by driving the elevating motor 5, the oscillation circuit 41 is energized to transmit the oscillation signal to the first motor wiring board 47 and simultaneously the brake signal to the brake setting circuit 48. Subsequently, the electric current flows through the intermittent/medium-speed operation wire 64 to the first motor brush board 50 to rotate the first motor 6, and the electric current is supplied through the brake setting circuit 48 to the brake sensors 52 and 56 for the first motor gear 29 and the second motor gear 31 so that the sensors 52 and 56 enter the waiting mode in the energized state. The first wiper 2 rotates at the start position by rotating the first motor 6 together with the motor gear 29 and, when the cam 53 engages with the second motor activation sensor 52 by rotation of the motor gear 29, the second motor activation signal is transmitted to the second motor wiring board 54. Then, the electric current flows through the intermittent/medium-speed operation wire 64 to the second motor brush board 54 to rotate the second motor 7 together with the motor gear 31, resulting in rotation of the second wiper 3.

Since the second wiper 3 rotates with a predetermined time interval after rotation of the first wiper 2, a lag angle can be formed between the two wipers. When the first wiper 2 makes one rotation to reach the start position, the cam 51 of the first motor gear 29 engages with the brake sensor 51, and the brake power supply and the energized brake sensor 51 transmit the brake signal to the first motor brush board 54 through the first motor wiring board 47 in order to stop the first wiper 2 and the first motor 6 with the motor gear 29. Subsequently, when the second wiper 3 conducts a 360-degree turn to reach the start position, the cam 57 of the second motor gear 31 engages with the brake sensor 56, and the brake sensor 56 transmits the brake signal to the second motor brush board 55 through the second motor wiring board 54 in order to stop the second wiper 3 at the start position as well as the second motor 7 with the motor gear 31. After a predetermined time, i.e., approximately five seconds, the oscillation signal is then transmitted and the above-described operation is repeated, thereby effecting the intermittent operation at intervals of about five seconds.

When switching the operation handle 36 from the changeover position (1) to the changeover position (2), the electric current flows to the docking circuit 71 through the conducting wire (b) and to the intermittent/medium-speed operation switching circuit 40, and the solenoid coil 73 is energized so as to make connection between the rotating shaft 24 of the first motor 6 and the rotation shaft 26 of the second motor 7 in order to form a lag angle between the two wipers, thereby enabling drive with the same one driving source. Further, a medium-speed drive signal is transmitted from the intermittent/medium-speed switching circuit 40 to the first motor wiring board 47 through the oscillation circuit 41 and to the second motor wiring board 54 through the second motor activation sensor 52 provided in the gear box of the first motor gear 29. The medium-speed drive signal is further transmitted to the two motor brush boards 50 and 55 to rotate the first and second motors 6 and 7 together with the first and second motor gears 29 and 31. As a result, the first and second wipers 2 and 3 having a lag angle formed therebetween rotate in the opposed directions at medium speed without interfering with each other.

When switching the operation handle 36 from the changeover position (2) to the changeover position (3), the electric current is supplied to the docking circuit 71 through the conducting wire (c) and to the high-speed operation separation circuit 66. The energized state of the solenoid coil 73 is maintained, and connection formed between the rotating shaft 24 of the first motor 6 and the rotating shaft 26 of the second motor 7 is kept. Further, a lag angle is formed between the two wipers so as to enable driving with the same drive source. In addition, by turning on the high-speed operation separation circuit 66, the high-speed operation signal is transmitted to the high-speed operation wire 69 of the first motor brush board 50 and the second motor brush board 55 through the first relay 67 and the second relay 68, respectively. The first motor 6 with the motor gear 29 is rotated together with the second motor 7 with the motor gear 31, and the first wiper 2 and the second wiper 3 rotate at high speed in the opposed directions with a lag angle formed therebetween so as not to interfere with each other.

Thereafter, when the operation handle 36 is switched from the changeover position (3) to the changeover position (2), the high-speed operation separation circuit 66 is turned off whilst the intermittent/medium-speed operation switching circuit 40 is turned on to effect the above-described medium-speed operation. Moreover, by switching from the changeover position (2) to the changeover position (1), both the intermittent/medium-speed switching circuit 40 and the docking circuit 71 are turned off, and the solenoid coil 73 activates the joint mechanism 35 to disconnect the rotating shaft 24 of the first motor 6 from the rotating shaft 26 of the second motor 7. Further, the oscillation circuit 41 is turned on to transmit the oscillation signal and the brake signal to the first motor wiring board 47 and the brake setting circuit 48 respectively to carry out the above-mentioned intermittent operation at intervals of approximately five seconds. Furthermore, when the operation handle 36 is switched from the changeover position (1) to the stop position (0), the oscillation circuit 41 is turned off to stop rotation of the first wiper 2 and the second wiper 3 at the start position, and the elevating relay 39 is also turned off to move down the wipers 2 and 3 from the start position to the housing position, thereby stopping the wipers 2 and 3.

According to the drive controlling apparatus of the present invention, it is possible to perform easily such intermittent operation in the rotary window cleaner by means of the electronic control circuit as in the known reciprocating window cleaner that one wiper rotates after rotation of the other wiper and the two wipers make one rotation at the start position and stop for a predetermined time at the start position every one rotation, and the two rotary wipers can securely carry out the medium-speed operation and the high-speed operation with a lag angle formed between these wipers being maintained. In addition, it is possible to accurately and securely control the elevating motor, the first motor and the second motor, by using the electronic control circuit, and the upward and downward movement, the intermittent operation, the medium-speed operation and the high-speed operation of the two wipers can be accurately and securely effected through the operation switch.

What is claimed is:

1. A drive controlling apparatus for a rotary window cleaner comprising:

an elevating motor for moving up and down two wipers, which are provided on a front window so as to be close to each other, to a housing position and a start position;

a first motor for rotating a first wiper at the start position in intermittent operation, medium-speed operation and high-speed operation;

a second motor for rotating a second wiper at the start position in intermittent operation, medium-speed operation and high-speed operation in a direction opposed to that of the first wiper;

said elevating motor, said first motor and said second motor each having a brush board; and an electronic control circuit for controlling the upward and downward movement of said first and second wipers, and for controlling the intermittent operation, the medium-operation and the high-speed operation of the first and second wipers, said electronic control circuit being connected to each said brush board of the elevating motor, the first motor and the second motor so as to enable the first and second wipers to perform the upward and downward movement, the intermittent operation, the medium-speed operation and the high-speed operation;

said electronic circuit further including provision for controlling a lag operation between said two wipers whereby the first and second motors can be controlled by the electronic control circuit so as to rotate one of said two wipers after a predetermined time from rotation of the other of said two wipers and stop each of said two wipers at the start position for a predetermined time every one rotation in the intermittent operation of the two wipers and thereby rotate the two wipers in the opposed directions with a lag angle formed therebetween without interfering with each other in the medium-speed operation and the high-speed operation.

2. The drive controlling apparatus for a rotary window cleaner as set forth in claim 1, wherein each said brush board of the elevating motor, the first motor and the second motor is connected to the electronic control circuit through an operation switch so as to enable the upward and downward movement, the intermittent operation, the medium-speed operation and the high-speed operation of the two wipers by the operation switch.

3. The drive controlling apparatus for a rotary window cleaner as set forth in claim 1, wherein the electronic control circuit includes an oscillation circuit for generating an oscillation signal for rotating one of said two wipers after a predetermined time from rotation of the other of said two wipers at intervals of a predetermined time, and a brake setting circuit for stopping the two wipers at the start position for a predetermined time every one rotation in the intermittent operation of the two wipers.

4. The drive controlling apparatus for a rotary window cleaner as set forth in claim 1, wherein the first and second motors have rotating shafts and wherein the electronic control circuit includes a docking circuit for energizing a s solenoid coil to connect the rotating shafts of the first and second motors in order that the two wipers can rotate in the opposed directions with a lag angle formed therebetween so as not to interfere with each other in the medium-speed operation and the high-speed operation of the two wipers.

5. The drive controlling apparatus for a rotary window cleaner as set forth in claim 1, wherein the electronic control circuit includes a first motor wiring board connected with the brush board for the first motor and a second motor wiring board connected with the brush board for the second motor, said electronic control circuit further including an intermittent/medium-speed operation switching circuit connected with both the first motor wiring board which is connected with the brush board for the first motor and the second motor wiring board which is connected with the brush board for the second motor in order to perform the medium-speed operation of the two wipers.

6. The drive controlling apparatus for a rotary window cleaner as set forth in claim 1, wherein the electronic control circuit includes an operation switch and a high-speed operation separation circuit connected with the brush board for the first motor and the brush board for the second motor by the operation switch respectively in order to perform the high-speed operation of the two wipers.

* * * * *